E. G. HERBERT & C. FLETCHER.
MACHINE FOR TESTING AND INDICATING THE EFFICIENCY OF FILES AND FOR SIMILAR PURPOSES.
APPLICATION FILED OCT. 22, 1906.

907,999.

Patented Dec. 29, 1908.
4 SHEETS—SHEET 1.

WITNESSES.
John Camp.
F. D. Bailey.

INVENTORS.
Edward G. Herbert
Charles Fletcher.
By their Attorney. Walter Gunn.

E. G. HERBERT & C. FLETCHER.
MACHINE FOR TESTING AND INDICATING THE EFFICIENCY OF FILES AND FOR SIMILAR PURPOSES.
APPLICATION FILED OCT. 22, 1906.

907,999.

Patented Dec. 29, 1908.
4 SHEETS—SHEET 3.

FIG. 3ª        FIG. 3ᵇ

WITNESSES.
John Camp.
P. D. Bailey.

INVENTORS.
Edward G. Herbert
Charles Fletcher
Walter Gunn.
By their Attorney

UNITED STATES PATENT OFFICE.

EDWARD G. HERBERT AND CHARLES FLETCHER, OF MANCHESTER, ENGLAND.

MACHINE FOR TESTING AND INDICATING THE EFFICIENCY OF FILES AND FOR SIMILAR PURPOSES.

No. 907,999.  Specification of Letters Patent.  Patented Dec. 29, 1908.

Application filed October 22, 1906. Serial No. 340,074.

*To all whom it may concern:*

Be it known that we, EDWARD GEISLER HERBERT and CHARLES FLETCHER, both subjects of the King of Great Britain and Ireland, and residents of Manchester, England, have invented a Machine for Testing and Indicating the Efficiency of Files and for Similar Purposes, of which the following is a specification.

This invention refers to and consists of a machine for automatically testing and indicating the efficiency or quality of files as used by engineers and others, the object being to provide reliable means of testing and recording the efficiency of files for the information and guidance of file makers and file users. The same machine is also intended for use in testing saws.

At present there are no satisfactory means for testing files, and price is usually the only criterion, which is often misleading. A good file will make 25,000 strokes with very little loss of sharpness, while a well-cut file of poor steel may cut as well when new, but will fail after a few thousand strokes. To properly test a file it is necessary to completely wear it out, and, for the purpose of comparison with other files, to obtain a record of, (1) the work done by the file, as measured by the quantity of metal filed away before the file ceases to cut, (2) the durability of the file as measured by the number of strokes it makes before ceasing to cut, (3) the rate at which the file performs such work, as measured by the amount of metal filed away for a given number of strokes, and (4) the rate at which the file loses its power of cutting.

The machine forming the subject of this invention is designed to automatically test the quality of a file and give a record or diagram by which the data or information above named can be readily determined.

Figure 1:
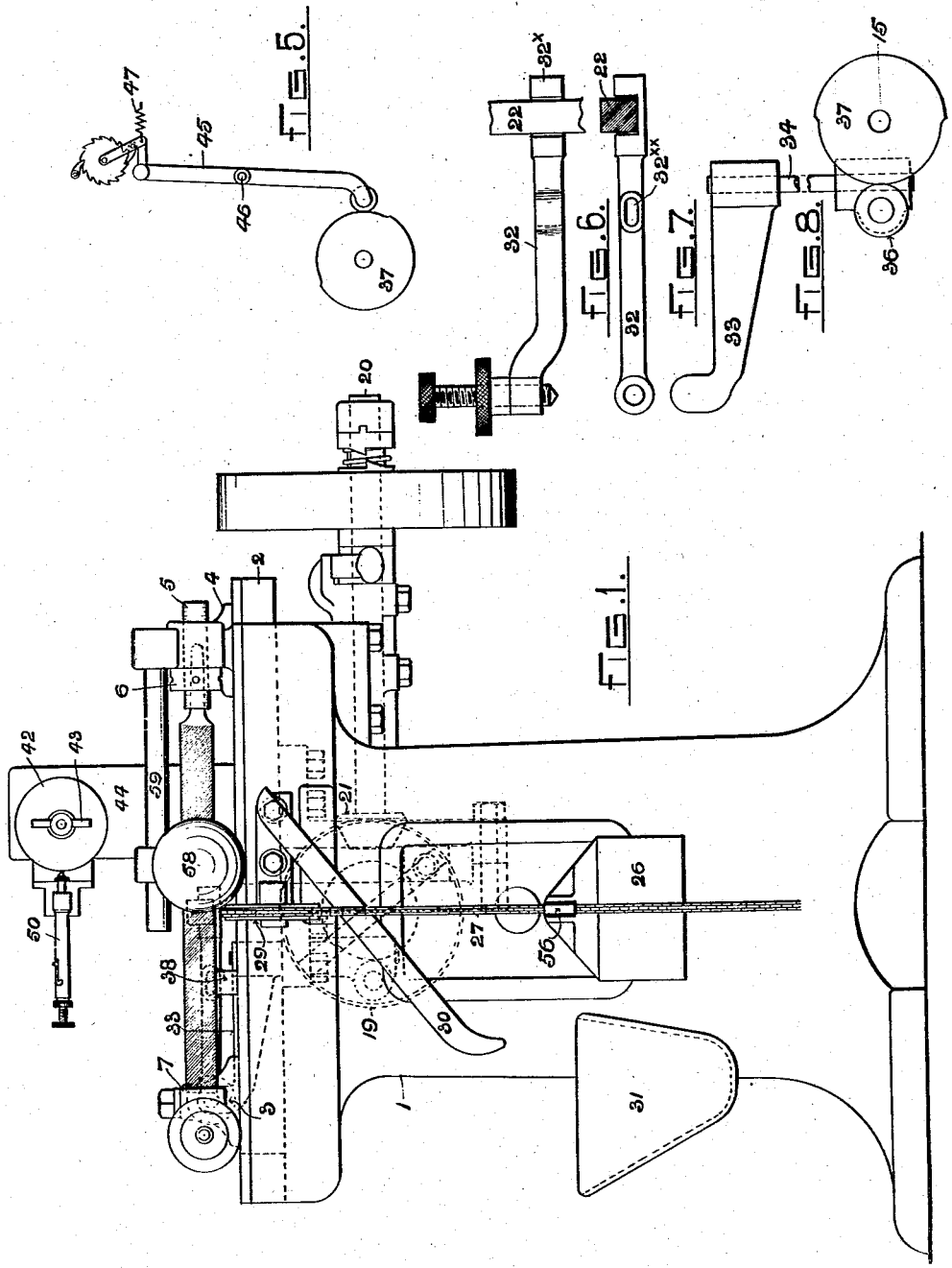
Figure 2:
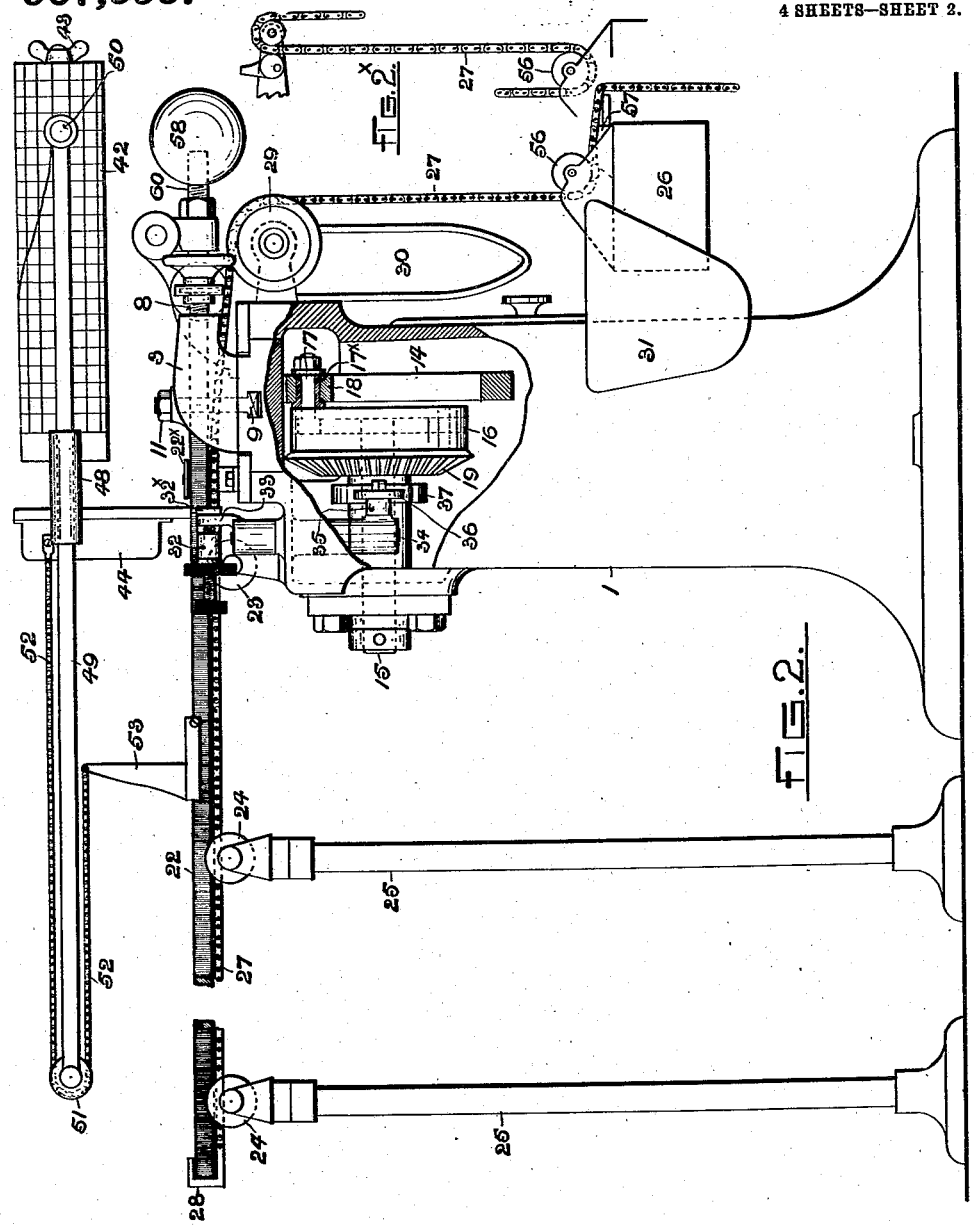
Figure 3:
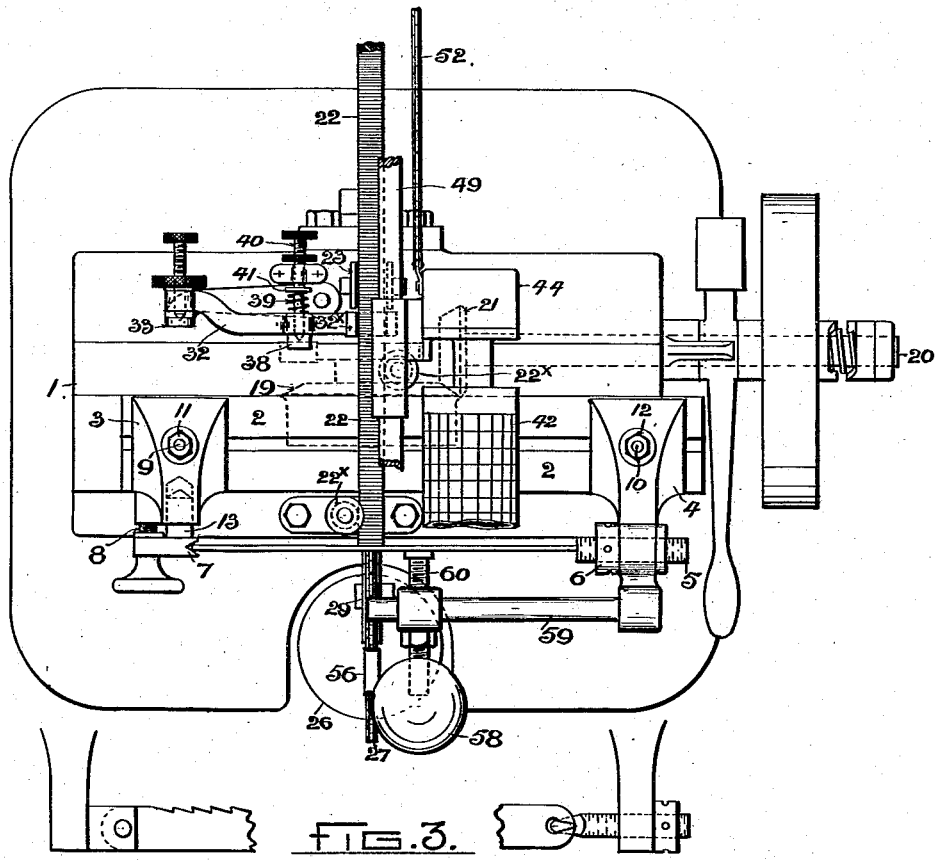
Figure 9:
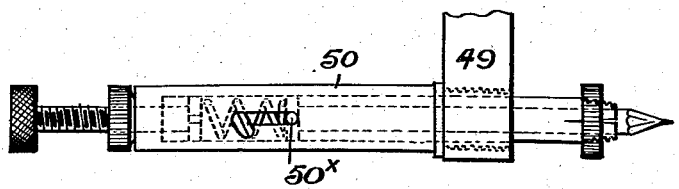
Figure 4:
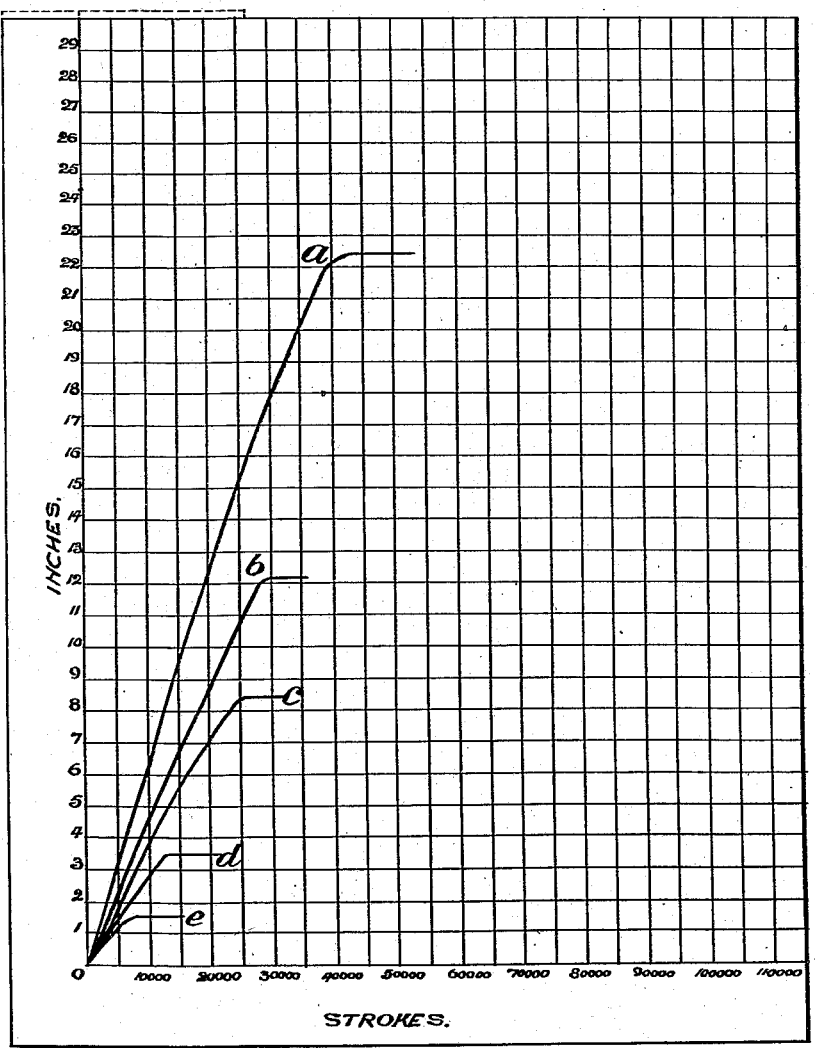

Upon the accompanying drawing, Figure 1 illustrates a front elevation, Fig. 2 a side elevation (partly broken away), and Fig. 3 a plan (in part) of a machine embodying our invention. Figs. 2×, 3ª and 3ᵇ illustrate modifications. Fig. 4 illustrates a specimen record produced by the machine of the tests of five different files of the same size and cut. Figs. 5 to 9 illustrate certain details separately.

1 is the cast-iron table or base part of the machine made to any suitable design. Slidably mounted in a recess formed in the top face of such base part is a slide or carrier 2, the recess being open at each end, and the carrier being free to move the whole length of the recess, and also to project beyond each end of the machine in moving to and fro as hereinafter explained. Upon the slide 2 are two adjustable headstocks 3, 4, one at or near each end. The headstock 4 is formed with a square boring through which loosely passes a screw-threaded and square tube or hollow bush 5. Screwing upon the said bush is a collar or nut 6. The headstock 3 is provided with a holder 7, which is adjustably secured to the headstock by a screw 8.

The file to be tested is held between the bush 5 and the V-shaped end of the holder 7. The headstocks 3, 4 are held to the slide 2 by T-bolts 9 10 and nuts 11, 12, which on being slackened allow the headstocks to be adjusted to suit the length of the file. The finer adjustments are obtained by the bush 5 and nut 6, which also serve to tighten the file in position. The purpose of supporting the file by means of the holder 7 is, that in case the file is tapered, it can be adjusted laterally at one end and its working face caused to lie in a plane parallel with that in which it moves. A stud 13 loosely fitting a hole in the headstock serves to prevent the holder turning with the screw, and holds it in alinement with the file.

Extending downwards from the underface of the slide or carrier 2 is a slotted arm 14, see Fig. 2, a part of the table top below the slide being left open to allow the arm to pass through and to move to and fro. Rotatably mounted upon a short shaft 15 in the machine bed is a disk 16, and secured to the face of such disk (by entering a T-shaped slot, see Fig. 2) is an adjustable and eccentrically mounted stud 17. Mounted upon each stud 17 is a sleeve 17× and loose upon such sleeve is a slide block 18 which neatly fits the slot in the arm 14. In one with or secured to the disk 16 is a bevel wheel 19. Upon a further shaft 20, which constitutes the driving shaft of the machine, see Figs. 1 and 3, is a bevel pinion 21 (see Fig. 3) which meshes with the bevel wheel 19, so that with the shaft 20 in motion it rotates the wheel 19 and disk 16, and the latter, by its stud 17, moves the arm 14 and slide 2 to and fro. The traverse of the slide 2, and therefore the stroke of the file, will depend on the position of the stud 17 relatively to the center of the disk.

The object on which the file operates is preferably a long bar of metal of standard section. Such bar, marked 22 on the drawing, see Figs. 2 and 3, is arranged at right angles to the file, and preferably at a point central to the machine. At one end the bar rests upon a small grooved roller 23 on the top of the machine, and at the other end and along its length it rests upon rollers 24 carried by stands or pillars 25. For advancing or feeding the bar 22 against the face of the file with an even pressure, use is made of a weight 26 and of a chain 27 and hook 28, the chain passing over a grooved guide pulley 29 below the bar 22 (the rollers 23 and 24 being grooved to allow it to pass), and the hook 28 engaging the end of the bar as shown. With the machine set in motion the file will move to and fro, and thus file away the bar, the filings falling down a chute 30 into box 31. As a file only cuts in one direction of its movement it is found desirable that the bar be moved clear of the file on the return or non-cutting stroke, and for that purpose a lever 22 is used, formed at one end with jaws $32^{\times}$ and designed to lie below (or above) the bar 32 and by the said jaws to loosely embrace such bar. At its other end the lever is provided with a set-screw, the point of which bears against the upturned end of a lever arm 33. The lever arm 33 is mounted fast upon a vertical spindle 34 carried in a bearing in the machine bed, and at its lower end it carries a short arm 35 with bowl 36. Fast upon the shaft 15 is a disk cam 37, see Figs. 1, 2 and 8, which, once in each revolution, moves the bowl 36 away from the shaft 15, and thus rotates the spindle 34, which, by the arm 33, presses upon the lever 32. This lever 32 is held against a fixed abutment 38 by a spring 39 which lies around a screw 40, and between an adjustable collar 41 and the lever 32, thus constantly pressing the lever against or towards the abutment 38. When against the abutment the lever 32 has no effect on the bar 22, which is free to slide forward between the jaws $32^{\times}$. When, however, the disk cam 37 rotates the spindle 34 and the arm 33 presses against the lever 32, the lever is first caused to tilt (the abutment 38 acting as a fulcrum) until the jaws $32^{\times}$ bind upon the sides of the bar 22, when it, the lever, is moved bodily backwards carrying with it the bar 22, which is thus brought out of contact with the file. To prevent the bar moving laterally and for holding it against the strokes of the file it lies between guide rollers $22^{\times}$. By the time the cam has made half a revolution (or thereabout) the bowl 36 comes opposite the reduced part of the cam, and under the pressure of the spring 39 the lever 32 is returned to its original position, the lever first moving forward bodily until it is against the abutment 38 and then moving about such abutment until it is again in the position shown in the drawing, by which time the bar 22 is again free, and capable, under the force exerted by the weight 26, of again pressing against the file. In the lever 32 is a slot $32^{\times\times}$ for the end of the screw 40 to project into.

The formation and axial setting of the cam 37, see Fig. 8, are such as to bring about the moving back of the bar at the end of each cutting stroke of the file and the release of the bar at or just prior to the commencement of each cutting stroke of the file.

Up to this point it will be seen that by our invention means are provided whereby a file may be automatically operated and caused to file away a given bar of metal. For some purposes the length of bar filed away in a given time will form a sufficient test of the quality of the file, but inasmuch as it is desirable to know how many cutting strokes the file makes in filing a given length of bar, and the rate at which the file performs the work in order to arrive at a true estimate of the relative merits between one file and another, means are required by which the strokes shall be counted. It is also desirable to have a record which will at once show, without calculation, the differences (if any) in the qualities of any two or more files, and further to provide a record which can be kept for reference. For these purposes the machine also comprises a rotary drum 42, around which is wrapped and held in any suitable manner a sheet of paper ruled and marked according to Fig. 4, the width and length of the sheet being preferably equal to the circumference and length of the drum. The drum is held to its spindle by a wing nut 43, so that it can be readily set to the starting point. The said spindle is in one with, or coupled to the spindle of the last member of an arrangement of speed-reducing gear, contained within a casing 44 bolted to the machine top. Loosely projecting into such casing is the upper end of a lever 45, see Fig. 5, and such lever is mounted upon a fixed stud 46. At its lower end the lever is provided with a bowl which bears against the edge of the disk cam 37 being held thereto by a spring 47. At its upper end the lever is linked to a small swing arm carried by the axis of the first member of the gear wheels and by such arm is carried a pawl designed to constantly engage the teeth of a ratchet wheel fixed to the said first wheel, or its axis, and with the movements of the lever, advance the gear once in every revolution of the disk cam 37, i. e., each time the file makes its cutting stroke. The gear in the casing 44 is preferably such as to rotate the drum only a very small fraction of a revolution at each forward stroke of the file.

Within a boss 48 upon the edge of the casing 44 is loosely mounted a rod 49 and at one end of such rod is carried a pencil holder 50. Adjustably held by such holder is a pencil, the point of which is designed to press lightly, under the pressure of a spring, upon the paper on the drum, except when the inner part of the holder is drawn back and retained by a pin 50$^\times$ working in the bayonet slot in the fixed and outer portion of the holder, see Fig. 9. At its other end the rod 49 carries a small pulley 51 and around such pulley passes a chain 52, which at one end is secured to the casing 44 and at the other end to an adjustable fitment 53 on the bar 22.

With the machine in motion and the file acting on the bar 22 the drum is slowly rotated, and with the bar 22 gradually filed away and moving forward the pencil is caused to move slowly along the face of the drum and mark thereon a line, which, in conjunction with the lines and numbers printed on the sheet of paper, see Fig. 4, will represent a record of the work done by the file. The fitment 53 might act directly upon the rod 22, but in order to allow for a long record upon a comparatively small drum it is preferred to use the pulley and chain, as shown, so that the movements of the pencil and rod 49 shall be half those of the bar 22, the sheet on the drum being ruled accordingly. When the bar 22 is moved backwards by the lever 32 the pencil is not affected thereby, the chain 52 merely slackening.

In Fig. 4 we have shown an example of five tests taken on one sheet, the several tests being marked $a$, $b$, $c$, $d$ and $e$ respectively. The movements of the pencil being half that of the test bar, owing to the pulley and chain, the lines on the sheet are only half an inch apart, but are numbered as inches. In the case of test $a$ it will be seen that 22 inches of the bar were filed away and the file made about 40,000 strokes before it ceased to cut. It also filed at a rate of about 6½ inches for the first 10,000 strokes, 6 inches for the next 10,000 strokes, slightly more than 5 inches for the next 10,000 strokes, and 4½ inches for the next, thus showing that it was a file of good quality. In the case of test $b$ only 12 inches of the bar were filed away and about 27,000 strokes made by the file before ceasing to cut, while the rate of cutting was 4¾ inches for the first 10,000 strokes, about 4 inches for the next 10,000 strokes, and rather less for the next, this example showing that the file cut fairly well at the start but deteriorated quickly. In the case of test $c$ the file cut at a slower rate than the file in test $b$, and was worn out sooner. In the case of test $d$ the file ceased to cut after about 12,000 strokes. This example is in marked contrast to the first test $a$, the file in that case, for the same number of strokes filing away about 8½ inches, while the file in test $d$ filed only 3½ inches. In the case of test $e$, the file ceased to cut after about 6,000 strokes and only filed about 1½ inches of the bar. By a comparison of these tests it will be seen how readily the efficiency or quality of a file may be ascertained.

To allow for the ready raising of the weight 26 after falling through a given distance, the chain 27 is connected to the weight by a pulley 56 and a wedge 57.

To avoid the too frequent raising of the weight the chain end may extend upwards, see Fig. 2$^\times$, and be adjustably held by a pulley and wedge near the pulley 29, the weight then falling at half the rate the test bar moves against the file.

To prevent the file chattering when making its cutting strokes a weight 58 may be provided, supported upon a rod 59 carried by the headstock 4 and pressing upon the file through a screw 60. For some files this weight may not be necessary.

While preferring to use a bar for testing purposes, any other and suitable object may be used, and while the machine is designed chiefly for testing files it may be used for testing the cutting efficiency of saw blades, the saw blade taking the place of the file and acting say upon a standard bar longitudinally and the strokes of the saw and the movements of the bar being recorded in like manner to those of the file and bar aforesaid. In fact, the word "file" is intended to include any device which, when moved to and fro by the slide, is capable of removing metal from the test bar.

When used for testing saw blades the headstocks 3 will have a fixed hook or clamp, and the headstock 9 will have an adjustable hook or clamp, see Figs. 3$^a$ and 3$^b$.

What we claim is:—

1. A machine for testing files and the like, comprising recording devices which make a record of the cutting strokes and the amount filed from the bar, means for reciprocating a file, means for transmitting the motion of the file to one element of the recording devices, means for feeding a test bar against the file, and means for transmitting the forward motion of the test-bar to another element of the recording devices, the movements of the said elements collectively producing the record.

2. For testing and indicating the quality or efficiency of files, saw blades and the like, a machine in which are means for holding the file or saw at each end, means for yieldingly holding and feeding a test bar against the file or saw, and means for moving the file or saw blade to and fro, in combination with a drum, chart and a recording pencil, a rotary cam, means actuated by the cam for imparting rotary movements to the drum and means actuated by the movement of the bar for imparting longitudinal movements to the pencil whereby a record is obtained of the data by which the quality of the file or saw is determined, substantially as set forth.

3. A machine for testing and indicating the quality or efficiency of files, saws and the like, comprising, in combination, a bed or base part, a carrier slidably mounted in the top of said base part, adjustable headstocks on said carrier, and means for enabling such headstocks to hold the file or saw to be tested endwise, means for imparting reciprocating motion to the carrier, a test bar of standard section arranged at right angles to the file or saw, grooved guide rollers for supporting the bar, and a chain, hook and weight for advancing the bar against the file or saw; a lever with jaws loosely engaging the test bar; a rotary cam, and means intermediate of the cam and lever whereby, as the file is making its idle or return stroke, the lever is caused to grip the bar and hold it away from the file, and, when the file is about to make its cutting stroke, release the bar; an arrangement of speed-reducing gear, a drum with chart or sheet upon its periphery and rotatably mounted upon the axis of the last member of the said gear; a lever and pawl for transmitting motion to the gear, means for actuating the lever from the carrier operating means, and a slidably-mounted rod carrying a pen or pencil adapted to move parallel to the axis of the said drum with the pencil gently pressing upon the chart, and an adjustable fitment on the test bar whereby as the bar moves the pencil-carrying rod is moved, substantially as herein set forth.

4. In a machine for testing the quality or efficiency of files, saw blades and the like, a bed or base part, in combination with a carrier slidably mounted in the top of said base part, adjustable headstocks on said carrier, and means for enabling such headstocks to hold the file or saw to be tested endwise, means for imparting reciprocating motion to the carrier, a test bar of standard section arranged at right angles to the file, grooved guide rollers for supporting the bar, and a chain, hook and weight for advancing the bar against the file or saw, a lever with jaws loosely engaging the test bar, a rotary cam, and means intermediate of the cam and lever whereby as the file is making its idle or return stroke, the lever is caused to grip the bar and hold it away from the file and when the file is about to make its cutting stroke release the bar, substantially as set forth.

5. In a machine for testing the quality or efficiency of files, saw blades and the like, comprising, in combination a bed or base part, a carrier slidably mounted in the top of said base part, adjustable headstocks on said carrier and means for enabling such headstocks to hold the file or saw to be tested endwise, means for imparting reciprocating motion to the carrier, a test bar of standard section arranged at right angles to the file grooved guide rollers for supporting the bar, and a chain, hook and weight for advancing the bar against the file or saw, substantially as set forth.

6. In a machine for testing the quality or efficiency of files, saw blades and the like, means for reciprocating the file, a lever with jaws loosely embracing the bar or other object used for testing the file, in combination with means whereby the lever is caused to periodically grip and move back the bar from the file when said file moves in one direction, and periodically release it when the file moves in the other direction, substantially as herein set forth.

In witness whereof we have hereunto set our hands in the presence of two witnesses.

EDWARD G. HERBERT.
CHARLES FLETCHER.

Witnesses:
P. D. BAILEY,
F. C. PENNINGTON.